Figure 1:
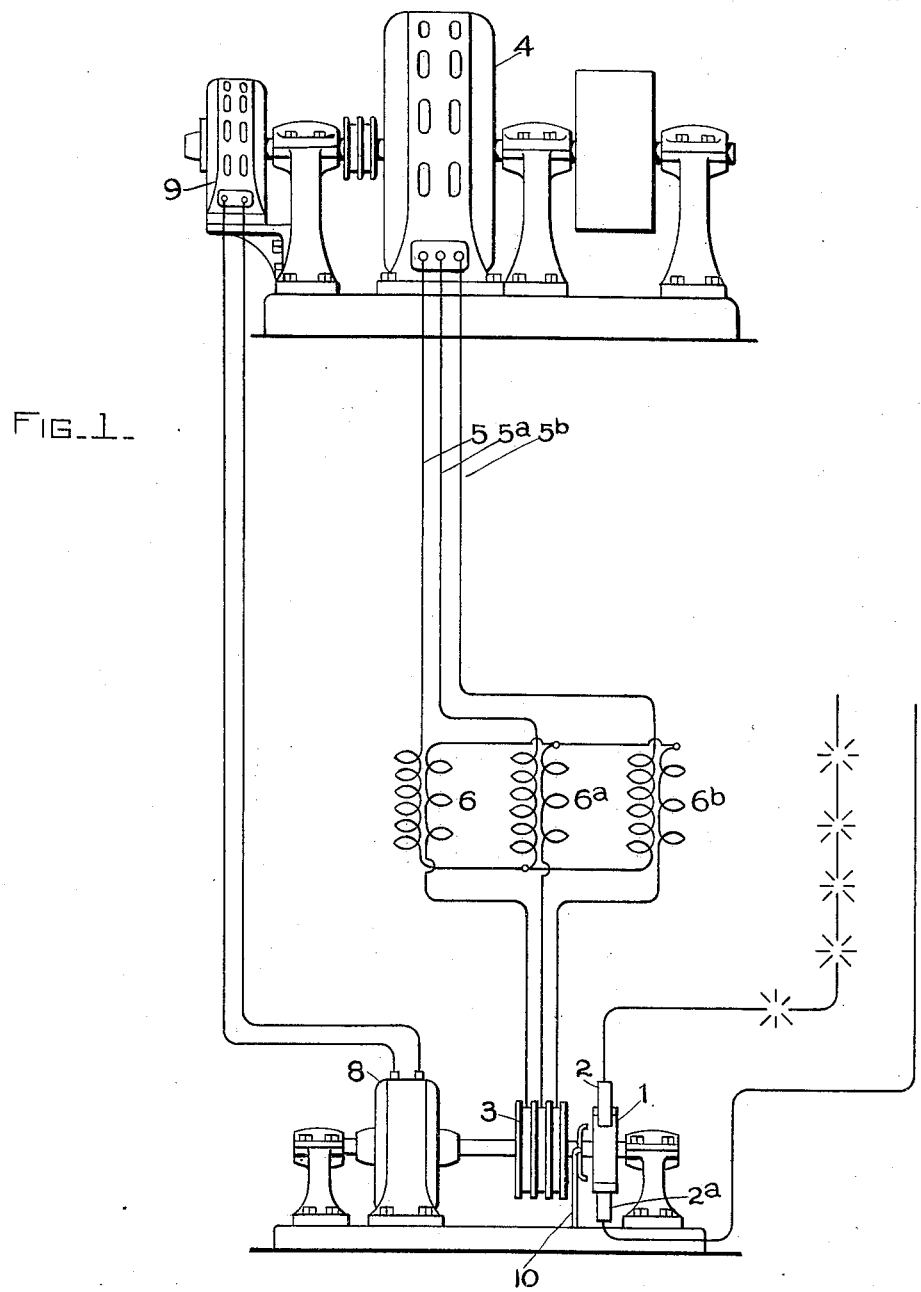

No. 655,032.  
E. THOMSON.  
RECTIFYING ALTERNATING CURRENTS.  
(Application filed Mar. 28, 1900.)  
Patented July 31, 1900.

(No Model.)  
2 Sheets—Sheet 1.

WITNESSES:  
Rollin Abell.  
Dugald McKillop.

INVENTOR:  
Elihu Thomson  
By Albert G. Davis  
Atty.

No. 655,032. Patented July 31, 1900.
E. THOMSON.
RECTIFYING ALTERNATING CURRENTS.
(Application filed Mar. 28, 1900.)
(No Model.) 2 Sheets—Sheet 2.
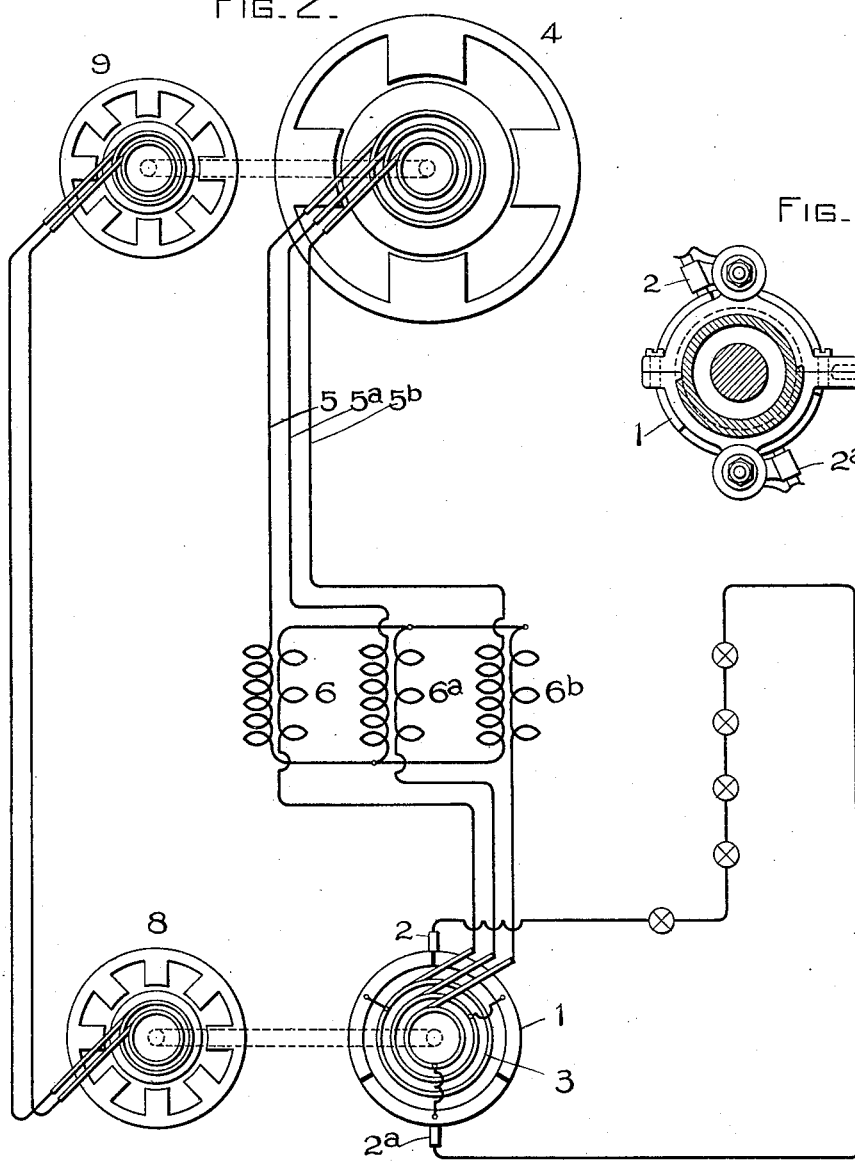
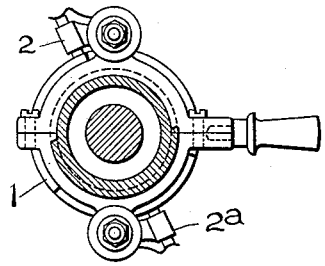
WITNESSES:
Lewis P. Abell
Benjamin B. Hull
INVENTOR:
Elihu Thomson,
By Albert G. Davis
Atty.

UNITED STATES PATENT OFFICE.

ELIHU THOMSON, OF SWAMPSCOTT, MASSACHUSETTS, ASSIGNOR TO THE GENERAL ELECTRIC COMPANY, OF NEW YORK.

RECTIFYING ALTERNATING CURRENTS.

SPECIFICATION forming part of Letters Patent No. 655,032, dated July 31, 1900.

Application filed March 28, 1900. Serial No. 10,436. (No model.)

*To all whom it may concern:*

Be it known that I, ELIHU THOMSON, a citizen of the United States, residing at Swampscott, county of Essex, State of Massachusetts, have invented certain new and useful Improvements in Rectifying Alternating Currents, (Case No. 1,516,) of which the following is a specification.

This invention relates to the rectification of alternating currents to adapt them for use on direct-current apparatus, and in a general sense to the maintenance of accurate synchronism between a driving and driven element. It has heretofore been the practice in redirecting or rectifying alternating or reverse currents to drive the commutator by which the rectification is effected by means of a synchronous motor dependent on the same mains which feed the transformer or the rectifying-commutator. A synchronous motor, however, may be in step with the generator which supplies the system without being in perfect synchronism therewith. In all such motors there is, in fact, a tendency which is more marked the lower the frequency to a deviation from true synchronism, due to slight hunting or fluctuation of speed. The tendency of such error is to produce sparking at the brushes of the rectifying-commutator.

It is the object of my invention to correct this tendency. The deviation from true synchronism will obviously be the less as the frequency of the current supplied to the synchronous motor is increased, since there must necessarily be a smaller angular deviation from a true synchronous position within the limits within which the motor can keep in step. In order, therefore, to maintain the rectifying-commutator within a better working relation to the phases of the alternating current being delivered, I operate the synchronous motor by which the commutator is driven by a current or currents of higher frequency than that which is being rectified.

The invention is not restricted in application to rectifying apparatus, but may be applied in any case where it is desirable to preserve two machines in close synchronism to one another.

My invention may be carried out in various ways and with systems of various character as to the number of phases, the only essential elements being that the driven apparatus shall be operated by a synchronous motor fed by a current having a higher number of cycles per second than the driven apparatus. In rectifying-currents I preferably mount the rectifying-commutator upon the driven shaft of the synchronous motor and wind the latter with relation to its source of supply so that its movable element may have a proper speed of rotation to produce a synchronous change of the commutator-segments with relation to the current to be commuted.

My invention therefore embodies a driven apparatus operated by a synchronous motor and means for correcting error in synchronism operated by impulses of higher frequency. It embodies also a rectifying apparatus for alternating currents, in which the commutator is driven by a synchronous motor fed by an alternating current having a higher frequency than the current to be commutated.

It embodies also other features, the novelty of which will be particularly described hereinafter and which will be definitely indicated in the claims appended hereto.

In the accompanying drawings, which illustrate the invention, Figure 1 is a diagram of a system embodying my improvements. Fig. 2 is another diagrammatic view of a similar system, and Fig. 3 is a diagrammatic detail of a rectifier.

Referring to Fig. 1, 1 represents a rectifying-commutator, and 2 $2^a$ a pair of brushes bearing on its periphery, connected in a direct-current distribution-circuit. (Shown, for the sake of example, as an arc-lamp circuit, but which of course may be of any desired character.) The commutator is mounted upon a shaft which carries three insulated collector-rings, as indicated at 3, connecting, respectively, with the several insulated parts of the rectifying-commutator. The collector-rings are supplied with alternating current from any desired source—as, for example, an alternator 4, located at a distant point, from which current is led by the mains 5 $5^a$ $5^b$. By way of example a triphase circuit has been shown with three collector-rings coöperating therewith. This, however, is a matter of mere selection, as the rectified current may be of any character as to the number of its phases or may even be a pulsatory reverse-current. I have shown also a bank of transformers 6 6ª 6ᵇ, by which the current may be stepped down in voltage, as in a long-distance transmission system, and rendered suitable for the local application to be made. With an arc-lighting circuit, as shown in the diagram, the transformers may be connected for delivering a constant current.

The rectifier is driven by a synchronous motor 8, having one member charged, as usual, by direct current, and the other member excited by an alternating current of higher frequency than the current supplied over the mains 5 5ª 5ᵇ. This current may be led from any suitable source, whether its origin be at the point of supply or at the point of distribution or some intermediate point, the only essential being that its rate of alternation shall be higher than that of the commutated current. I have shown in the drawings an organization in which this motor is supplied by an auxiliary generator at the main supply-station, as indicated at 9, and which is provided with a greater number of poles than the generator 4. Fig. 2 renders this organization more intelligible, the main supply-generator in this case being shown as having four poles and the auxiliary generator as having eight poles. The number of cycles supplied the synchronous motor 8 will therefore be twice that of the commutated current, and any error of synchronism resulting from a tendency of the driven motor to hunt will be greatly minimized, and the redirecting-commutator will spark much less than if it were operated by a branch of the current being commutated. The commutator-brushes should be mounted for angular adjustment, so as to be shifted to the best working relation to the supply-current and to permit adjustment of the different conditions of load on the system. Where the synchronous motor is operated at a speed synchronous with the commutated current, the commutator employed may be a three-part commutator. For example, in Fig. 1 the commutator shown is a three-part commutator, and the speed of the shaft in this case is the same as that of the rate of alternation delivered by the generator 4. This would follow from the same number of poles being employed in the motor and generator of the synchronous system 8 and 9. The commutator might, however, be driven at a multiple or different speed by making the number of poles in the motor 8 different from that in the generator 9, a relationship which is well understood by those familiar with alternating currents. In such a case the commutator should be accordingly changed—for example, if operated at double speed a six-part commutator having opposite segments cross connected should be employed. An air-blast may be employed across the contact-point of the brushes to blow out any arc that tends to form. Such an arrangement is indicated at 10 in Fig. 1. The connections between the collector and rectifier in the case of polyphase rectification will follow the order of phase delivery of the several currents. Thus the motor 8, although revolving the commutator-shaft at a proper speed for the cycles delivered by the generator 4, is itself operated by a circuit having a higher number of cycles per second, and it is manifest that it cannot vary greatly in speed without getting out of step and that during each of the cycles of the generator 4 more than a cycle will have transpired in the motor, and any angular deviation from a true synchronous position under an effort of the motor to hunt or lag will be smaller by reason of the shortness of the cycle. The arrangement shown in Fig. 1 might be regarded as a system of electrical gearing between the generating and rectifying stations, which is far more definite and positive than if the rectifier were operated by the frequency of the distributing system, and, indeed, the frequency operating the synchronous motor might be such as to effect substantially-perfect synchronism. In practice, however, this is not required, as unless the variations are considerable the rectifying-commutator will work properly. In systems operated with currents of low frequency, however, the variations are too great to permit proper commutation and destructive arcing at the commutator follows, and it is for such systems that the arrangements described in my present invention are especially intended.

What I claim as new, and desire to secure by Letters Patent of the United States, is—

1. Means for maintaining synchronism between two electric machines connected in the same alternating-current circuit, comprising a synchronous motor and a source of supply therefor delivering impulses of higher frequency but constant relation to the currents in said circuit.

2. Means for rectifying an alternating current, comprising a commutator, a synchronous motor operating the same, and a source of electric alternation impelling the motor having a higher rate than that of the current to be rectified.

3. Means for rectifying alternating currents, comprising a commutator, a synchronous motor for driving the same, and a generating-station supplying the rectifier and the motor, the latter having the higher rate of electric alternation.

4. The combination in an alternating-current circuit, of a rectifying device, a synchronous motor for keeping it in step with the impulses to be rectified, and means for preserving proximity of phase between the rectifier and the impulses.

5. Means for rectifying alternating currents, comprising a polyphase circuit, a rectifier, a local distribution-circuit for the rectified current, in operative relation thereto, a synchronous motor operating the rectifier, and a source of higher frequency for the motor, said source being maintained in synchronous operation with the polyphase circuit.

In witness whereof I have hereunto set my hand this 24th day of March, 1900.

ELIHU THOMSON.

Witnesses:
DUGALD MCKILLOP,
ROBERT SHAND.